United States Patent
Horn et al.

(10) Patent No.: US 7,226,134 B2
(45) Date of Patent: Jun. 5, 2007

(54) METHOD FOR STABILIZING THE DRIVING STATE OF A UTILITY VEHICLE COMBINATION

(75) Inventors: Matthias Horn, Hardheim (DE);
Stefan Hummel, Stuttgart (DE); Falk Hecker, Markgroeningen (DE); Ulrich Guecker, Schwieberdingen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/488,997

(22) PCT Filed: Sep. 6, 2002

(86) PCT No.: PCT/EP02/09979

§ 371 (c)(1),
(2), (4) Date: Sep. 14, 2004

(87) PCT Pub. No.: WO03/022650

PCT Pub. Date: Mar. 20, 2003

(65) Prior Publication Data
US 2005/0011693 A1    Jan. 20, 2005

(51) Int. Cl.
*B60T 7/20* (2006.01)
(52) U.S. Cl. .......................... 303/7; 303/123
(58) Field of Classification Search ............ 188/3 H, 188/112 A; 303/7, 15, 123
See application file for complete search history.

(56) References Cited

U.S. PATENT DOCUMENTS

| | | | |
|---|---|---|---|
| 5,029,948 A | 7/1991 | Breen et al. | |
| 5,152,544 A * | 10/1992 | Dierker et al. | 280/432 |
| 5,372,413 A * | 12/1994 | Broome et al. | 303/118.1 |
| 5,380,072 A | 1/1995 | Breen | |
| 5,496,096 A | 3/1996 | Petersen et al. | |
| 5,496,098 A * | 3/1996 | Brearley | 303/22.2 |
| 5,579,228 A * | 11/1996 | Kimbrough et al. | 701/41 |
| 5,722,740 A * | 3/1998 | Engelbert et al. | 303/118.1 |
| 6,446,998 B1 * | 9/2002 | Koenig et al. | 280/432 |
| 6,498,977 B2 | 12/2002 | Wetzel et al. | |
| 6,516,260 B2 * | 2/2003 | Wetzel et al. | 701/50 |
| 6,522,956 B2 * | 2/2003 | Hecker et al. | 701/1 |

FOREIGN PATENT DOCUMENTS

| | | |
|---|---|---|
| DE | 199 63 747 A1 | 7/2001 |
| DE | 199 64 058 A1 | 7/2001 |
| DE | 199 64 164 A1 | 7/2001 |
| DE | 100 19 150 A1 | 10/2001 |
| EP | 1 167 141 A1 | 1/2002 |
| JP | 2000-43702 A | 2/2000 |
| RU | 2 049 004 C1 | 11/1995 |
| SU | 867732 | 9/1981 |
| SU | 919917 | 4/1982 |
| SU | 933507 | 6/1982 |

OTHER PUBLICATIONS

Russian Examination Report dated Jun. 7, 2006.

* cited by examiner

*Primary Examiner*—Christopher P. Schwartz
(74) *Attorney, Agent, or Firm*—Crowell & Moring LLP

(57) ABSTRACT

According to the invention, the driving stability of a utility vehicle combination, which is comprised of a towing vehicle and of a towed vehicle, is monitored (3-5) when the towed vehicle is braked. In the event of an unstable driving state, the vehicle combination is stabilized by effecting a cyclic or clocked reduction of the towed vehicle brake pressure (6).

10 Claims, 1 Drawing Sheet

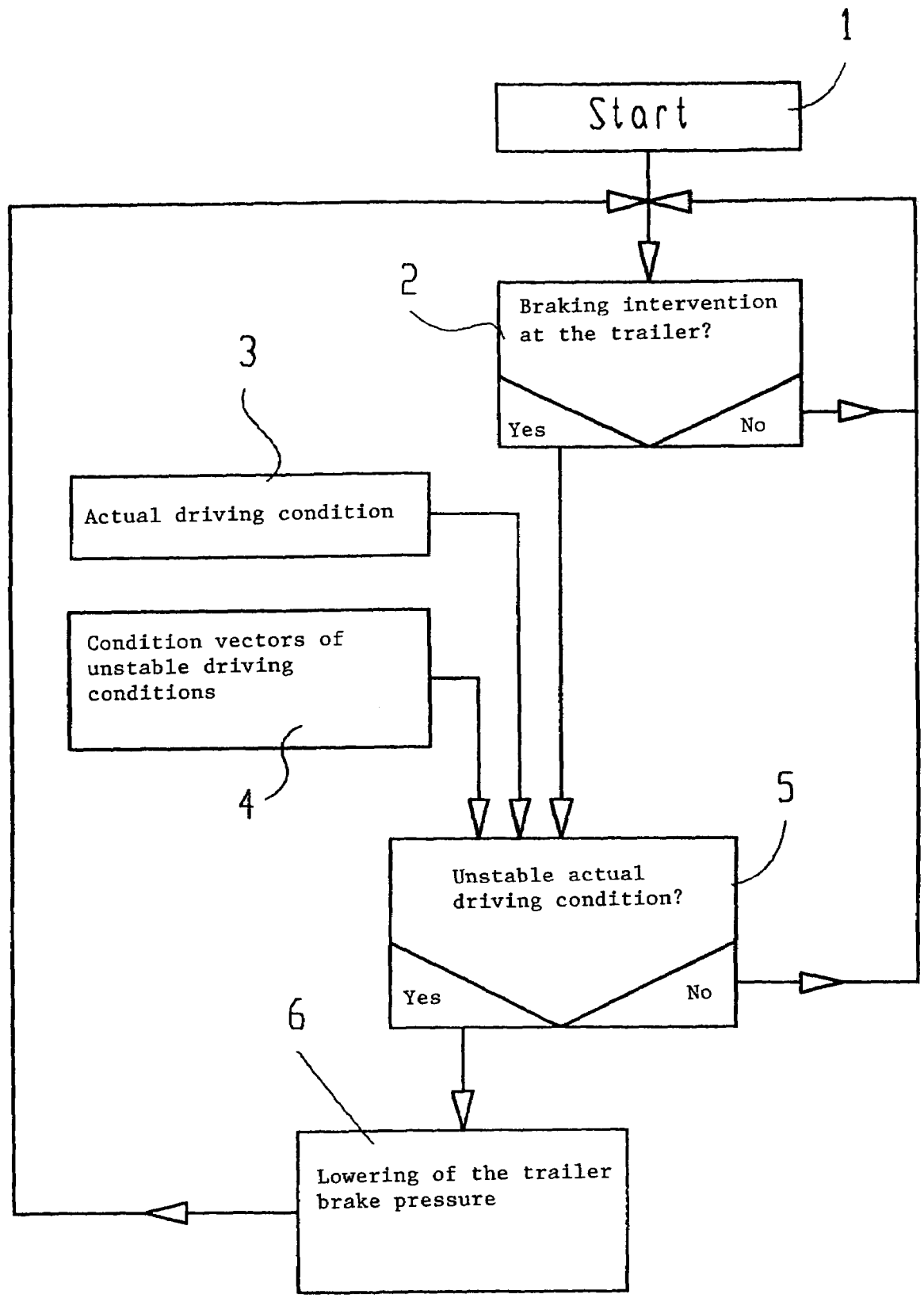

METHOD FOR STABILIZING THE DRIVING STATE OF A UTILITY VEHICLE COMBINATION

BACKGROUND AND SUMMARY OF THE INVENTION

The present invention relates to a method of stabilizing the driving condition of a utility vehicle combination a towing vehicle and a towed vehicle (trailer).

In the future, utility vehicles will increasingly be equipped with an antilock braking system (ABS), a wheel slip control system (ASR) and an electronic stability program (ESP) in order to stabilize the vehicle or the vehicle combination in critical driving situations. By means of ABS and ASR systems, the brake pressures at the individual wheel brake cylinders are individually controlled such that a locking or a spinning of the wheels is avoided.

By means of an ESP system, electronically active brake pressures are controlled-in at one or several wheel brake cylinders of the towing vehicle and/or of the trailer in critical, that is, unstable, driving conditions, particularly when there a danger of swerving, in order to stabilize the vehicle or the vehicle combination. In this case, depending on the driving condition, also longer braking interventions may also occur at the trailer or semitrailer. Under unfavorable conditions, particularly when the tires are in poor condition or the ABS operates defectively, such longer braking interventions may result in the lateral "swinging-out" of the trailer or semitrailer.

This problem occurs particularly in the case of trailers or semitrailers which are braked when cornering. Braking then leads to a loss of the lateral control, which may cause a swinging-out. A "swinging-out" may occur during a braking by the driver as well as during an electronic braking intervention by the ESP.

It is an object of the invention to avoid the swinging-out of the trailer.

This object is achieved by a method of stabilizing the driving condition of a vehicle combination including a towing vehicle and a trailer, the method comprising the acts of a) monitoring whether a braking intervention is taking place at the trailer; b) sensing one or more driving condition quantities characterizing the momentary stability of the vehicle combination; c) determining whether an unstable driving condition is present or imminent; and d) lowering the braking torques at the trailer wheels when an unstable driving condition is detected in step c) during a braking intervention. Advantageous embodiments and further developments of the invention are described and claimed herein.

The basic principle of the invention consists of monitoring the driving stability of the vehicle combination during the braking of the trailer vehicle and stabilizing the vehicle combination in the event of an unstable driving condition by the cyclic or clocked reduction of the wheel braking torques of the trailer or of the trailer brake pressure.

In other words, the wheel braking torques of the trailer or the brake pressure to the trailer or semitrailer are "modulated". "Modulating" means that, during the operation of the trailer brakes, short phases are repeatedly "inserted" which have no brake pressure or only a slight brake pressure. This can take place as a function of the driving situation; that is, in the case of an unstable towing vehicle and a thereby required ESP intervention at the trailer/semitrailer, the brake pressure of the trailer or semitrailer is controlled in a clocked manner.

Preferably, a modulation or clocking of the trailer wheel braking torques takes place only in really critical driving situations. For this purpose, the "moving condition" of the vehicle combination has to be monitored. The moving condition, or the momentary stability of a vehicle combination is a complicated vector quantity, which can be approximately described by a plurality of variables.

Particularly, the vehicle speed or the rotational speeds of individual vehicle wheels, the steering angle, the articulation angle between the trailer and the towing vehicle, the articulation angle velocity, the lateral acceleration, the axle load distribution, etc. are characteristic with respect to the stability of a vehicle movement.

For measuring or determining these quantities, various sensors are provided on the towing vehicle or on the towed vehicle (trailer), such as rotational wheel speed sensors, yaw rate sensors, etc. For detecting the "swing-out danger", sensors can also be provided for measuring or determining the articulation angle between the trailer and the towing vehicle.

The clocking or modulating of the trailer wheel braking torques can take place during braking by the driver, as well as in the case of an ESP braking intervention.

The invention is particularly suitable for a semitrailer unit with a semitrailer tractor equipped with an ESP. The semitrailer unit is preferably equipped with a sensor for measuring the articulation angle between the tractor and the semitrailer.

However, as an alternative thereto, the invention is also suitable for a semitrailer unit which is equipped with an ESP but has no articulation angle sensor. In the case of an ESP-controlled braking of the semitrailer, for example, on a road with a low coefficient of friction, the brake pressure to the semitrailer controlled in by the ESP is reduced to zero at certain time intervals. As explained above, the semitrailer is thereby stabilized and a swinging-out is avoided.

When no articulation angle sensor is present, the articulation angle can be estimated on the basis of different available driving condition quantities and of a specifically defined mathematical-physical vehicle model. For this purpose, sensors can be provided which measure the "orientation" of the tractor and of the semitrailer, from which the articulation angle can be determined. In addition, signals can be analyzed which are supplied by a navigation or communication system present in the vehicle.

On the basis of the defined vehicle-specific mathematical-physical model, the ESP determines a desired value for the articulation angle between the towing vehicle and the semitrailer.

When the amount of the determined articulation angle is clearly above the desired value, that is, when a significant deviation exists between the desired value and the actual value and the semitrailer is braked simultaneously, it is assumed there is a danger that the semitrailer may swing out.

For stabilizing this unstable driving condition, as a result of the ESP, the brake pressure to the semitrailer is reduced to zero at certain time intervals. As a result, the wheels of the semitrailer can "run up" again, that is, accelerate, whereby lateral forces are built up and the semitrailer is stabilized.

When no sensor is available for measuring the articulation angle between the trailer and the towing vehicle, and the articulation angle can also not be determined or estimated in another manner, the swinging-out problem can also be countered "preventively". This means that the clocked controlling-in of the brake pressure or the repeated "braking force reduction" takes place in certain situations, for example, when the road is very smooth, specifically without the knowledge of the articulation angle. It may be provided that in this case only the information supplied by the towing vehicle is taken into account.

The signal for reducing the wheel braking torques or the trailer brake pressure can be transmitted, for example, pneumatically, electrically or by radio from the towing vehicle to the trailer vehicle.

In the following, the invention will be explained in greater detail by means of an embodiment in connection with the drawing.

BRIEF DESCRIPTION OF THE DRAWING

The single FIG. 1 is a flow chart of the process on which this invention is based.

DETAILED DESCRIPTION OF THE DRAWING

Beginning with a starting step 1, it is constantly checked in a step 2 whether a braking intervention is taking place at the trailer. If no braking intervention is taking place, step 2 is implemented again.

However, if a braking intervention is taking place at the trailer, the "stability" of the actual driving condition is measured in step 3; for example, by measuring the articulation angle between the towing vehicle and the trailer vehicle, the rotational wheel speeds, the longitudinal and lateral accelerations, the wheel slips, the axle load distribution, the road inclination, etc.

Diverse "condition vectors", which characterize critical driving conditions, are stored in the electronic braking system of the vehicle. Such "critical driving condition vectors" may be generated by individual quantities of the above-mentioned driving condition quantities or by combinations of the above-mentioned driving condition quantities. The stored driving conditions vectors are schematically indicated in FIG. 1 by means of block 4.

In step 5, the actual driving condition is compared with the defined critical driving condition vectors. If the comparison shows that the driving condition is not unstable, a return takes place to step 2; that is, the braking intervention by the driver or the ESP is not "modified".

However, if the driving condition is critical, the wheel braking torques of the trailer or the trailer brake pressure are modulated, that is, clocked, in step 6. The trailer brake pressure or the wheel braking torques are therefore briefly lowered. Subsequently, a return to step 2 takes place and the entire monitoring routine is implemented again.

The invention claimed is:

1. A method of stabilizing a driving condition of a vehicle combination including a towing vehicle and a towed vehicle, the method comprising the acts of:
   a) monitoring whether a braking intervention is taking place at the towed vehicle;
   b) sensing one or more driving condition quantities characterizing a momentary stability of the vehicle combination, wherein, using a defined mathematical-physical vehicle model, an approximate articulation angle between the towing vehicle and the towed vehicle is determined and compared with a desired articulation angle, which desired articulation angle is determined as a function of a momentary driving condition and characterizes a stable driving condition;
   c) determining whether an unstable driving condition is present or imminent based on the momentary stability by determining coefficients of friction which describe an actual or threatened instability; and
   d) modulating braking torques at wheels of the towed vehicle when an unstable driving condition is detected in step c) during a braking intervention by varying brake pressure of the towed vehicle in a clocked or cyclical manner by repeatedly inserting short phases having no brake pressure or only a slight brake pressure, wherein the braking torques at the towed vehicle wheels are modulated as a function of the determined coefficients of friction with respect to their amplitude and their time response.

2. The method according to claim 1, wherein, in step c), a comparison is made between the one or more sensed driving condition quantities and one or more assigned driving condition quantities characterizing an unstable driving condition.

3. The method according to claim 2, wherein, in step b), using a defined mathematical-physical vehicle model, determining an approximate articulation angle between the towing vehicle and the towed vehicle, and further wherein the determined articulation angle is compared with a desired articulation angle, which desired articulation angle is determined as a function of a momentary driving condition and characterizes a stable driving condition.

4. The method according to claim 1, wherein a brake pressure of the towed vehicle is lowered to zero in step d).

5. The method according to claim 1, wherein, in the case of an ESP intervention, the towed vehicle brake pressure is lowered.

6. The method according to claim 1, wherein the towed vehicle brake pressure is lowered during a braking operation by a driver.

7. The method according to claim 1, wherein, in step a), an intensity of the braking intervention at the towed vehicle is determined, and further wherein the modulating of the braking torques takes place as a function of the intensity of the braking intervention.

8. The method according to claim 1, wherein, in step d), the modulating of the braking torques by using a pulse-pause ratio and a lowering amplitude is further modulated by the degree of the actual or threatened instability of the driving condition.

9. The method according to claim 1, wherein, in step d), the modulating is coordinated with other safety, assistance or comfort systems of the vehicle.

10. The method according to claim 1, wherein, in step c), an articulation angle occurring between the towing vehicle and the towed vehicle is precalculated on the basis of a defined mathematical-physical vehicle model.

* * * * *